(12) United States Patent
Mandeville (10) Patent No.: US 12,534,862 B2
(45) Date of Patent: Jan. 27, 2026

(54) SNOW REMOVAL DEVICE WITH CONTINUOUSLY ROTATABLE DISCHARGE CHUTE

(71) Applicant: HUSQVARNA AB, Huskvarna (SE)

(72) Inventor: Kenneth Mandeville, Midland, NC (US)

(73) Assignee: HUSQVARNA AB, Huskvarna (SE)

( * ) Notice: Subject to any disclaimer, the term of this patent is extended or adjusted under 35 U.S.C. 154(b) by 522 days.

(21) Appl. No.: 18/011,633

(22) PCT Filed: Sep. 28, 2021

(86) PCT No.: PCT/US2021/052341
§ 371 (c)(1),
(2) Date: Dec. 20, 2022

(87) PCT Pub. No.: WO2022/132280
PCT Pub. Date: Jun. 23, 2022

(65) Prior Publication Data
US 2023/0228051 A1    Jul. 20, 2023

Related U.S. Application Data

(60) Provisional application No. 63/125,608, filed on Dec. 15, 2020.

(51) Int. Cl.
*E01H 5/04* (2006.01)
*E01H 5/08* (2006.01)

(52) U.S. Cl.
CPC ............... *E01H 5/045* (2013.01); *E01H 5/08* (2013.01)

(58) Field of Classification Search
None
See application file for complete search history.

(56) References Cited

U.S. PATENT DOCUMENTS 3,879,866 A   4/1975   Gunderson
4,557,535 A   12/1985  Keane
(Continued)

FOREIGN PATENT DOCUMENTS

CN   106638438 A   5/2017
CN   206591479 U   10/2017
(Continued)

OTHER PUBLICATIONS

International Search Report and Written Opinion for International Application No. PCT/US2021/052341 mailed Jan. 10, 2022.
(Continued)

*Primary Examiner* — Christopher J Sebesta
*Assistant Examiner* — Alfred H Tsui
(74) *Attorney, Agent, or Firm* — Burr & Forman (57) ABSTRACT

A snow removal device may include a chassis supporting a power unit, a mobility assembly operably coupled to the chassis to provide mobility for the snow removal device responsive to power provision from the power unit, a working assembly configured to move snow to an ejection path responsive to power provision from the power unit, and a chute assembly forming a portion of the ejection path, the chute assembly comprising a chute and a deflector. The chute may be rotatable via a chute rotator configured to provide at least 360 degree automated rotation of the chute. An orientation of the deflector may be changeable via automated pivoting of the deflector via an electrically operable deflector adjuster.

18 Claims, 6 Drawing Sheets

(56) References Cited

U.S. PATENT DOCUMENTS

| | | | |
|---|---|---|---|
| 2002/0178622 A1* | 12/2002 | Loegering | E01H 5/098 37/244 |
| 2003/0033736 A1 | 2/2003 | Fortin | |
| 2014/0180478 A1 | 6/2014 | Letsky | |
| 2015/0068074 A1* | 3/2015 | Mast | E01H 5/098 37/197 |
| 2015/0218764 A1 | 8/2015 | Schisel et al. | |
| 2015/0354158 A1 | 12/2015 | Arntz et al. | |
| 2018/0333130 A1 | 11/2018 | Knobl et al. | |
| 2019/0048544 A1 | 2/2019 | Hiller et al. | |
| 2021/0262183 A1* | 8/2021 | Favorito | E01H 5/098 |
| 2022/0074156 A1* | 3/2022 | Li | E01H 5/098 |

FOREIGN PATENT DOCUMENTS

| | | |
|---|---|---|
| CN | 206591481 U | 10/2017 |
| CN | 109487744 A | 3/2019 |
| CN | 110295569 A | 10/2019 |
| EP | 2615210 A2 | 7/2013 |
| JP | 2002161521 A | 6/2002 |
| JP | 2014153297 A | 8/2014 |
| JP | 2017141613 A * | 8/2017 |
| WO | 2013165480 A1 | 11/2013 |
| WO | 2013173338 A1 | 11/2013 |
| WO | 2018193425 A1 | 10/2018 |
| WO | 2019038695 A1 | 2/2019 |

OTHER PUBLICATIONS

Mini Snow Blower, Available Online at:https://spykerworkshop.com/shop/other/allprintedproducts/snow-blower-kit/, Retrieved on Nov. 25, 2019, 8 pages.

* cited by examiner

SNOW REMOVAL DEVICE WITH CONTINUOUSLY ROTATABLE DISCHARGE CHUTE

TECHNICAL FIELD

Example embodiments generally relate to snow removal devices and, more particularly, relate to a snow removal device (e.g., a robotic vehicle) that has a discharge chute capable of rotating 360 degrees.

BACKGROUND

Grounds maintenance tasks are commonly performed using various tools and/or machines that are configured for the performance of corresponding specific tasks. Certain tasks, like snow or ice removal, are typically performed using manually operated tools or vehicles. More recently, robotic devices and/or remote controlled devices have also become options for consumers to consider. Moreover, the use of a robotic vehicle that operates either autonomously or via remote control may create a number of unique design and operational considerations that are normally not possible for manually operated devices.

Some of these design of operational considerations may require new solutions to be developed that had not previously been needed or considered helpful. Accordingly, it may be desirable to provide additional capabilities and corresponding devices or component assemblies that are designed to provide such additional capabilities.

BRIEF SUMMARY OF SOME EXAMPLES

Some example embodiments may therefore provide a snow removal device. The snow removal device may include a chassis supporting a power unit, a mobility assembly operably coupled to the chassis to provide mobility for the snow removal device responsive to power provision from the power unit, a working assembly configured to move snow to an ejection path responsive to power provision from the power unit, and a chute assembly forming a portion of the ejection path, the chute assembly comprising a chute and a deflector. The chute may be rotatable via a chute rotator configured to provide at least 360 degree automated rotation of the chute. An orientation of the deflector may be changeable via automated pivoting of the deflector via an electrically operable deflector adjuster.

In another example embodiment, a chute assembly for a snow removal device may be provided. The chute assembly may include a chute forming a portion of an ejection path from a working assembly of the snow removal device, and a deflector disposed at a distal end of the chute. The chute may be rotatable via a chute rotator configured to provide at least 360 degree automated rotation of the chute responsive to power provision from a power unit. An orientation of the deflector is changeable via automated pivoting of the deflector via an electrically operable deflector adjuster.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, robotic snow removal machines may enable new design options that had not previously been needed or considered helpful. For example, since a manually operated snow removal machine necessarily has an operator, the location at which the operator engages with the machine (e.g., the operator station) is essentially disqualified as a possible direction to which the discharge chute may be selected for discharging snow being ejected from the machine. Thus, even though it has long been recognized that it is desirable for operators to select the direction to which the snow should be ejected from the machine, there has always been at least one direction to which ejection would simply never be desirable.

By providing autonomous or remotely operated snow removal devices, the operator station is eliminated, and the possibility of having a snow removal device that can eject snow to any selectable direction, 360 degrees around the device becomes possible. Some of the design features of conventional snow removal devices for providing rotation of the discharge chute, and for controlling a deflector (e.g., at the distal end of the chute) involve cables or wires, and are therefore incompatible with a chute that can rotate continuously over a 360 degree range. In this regard, the wires or cables would become wrapped around components at some point and limit movement, or even be damaged.

Some example embodiments may provide a snow removal device (e.g., a remotely controllable or autonomous robotic vehicle) that employs a rotator (or rotation assembly) that is capable of continuously rotating over more than 360 degrees. Example embodiments may provide such a rotator that also has a deflector that is operable to change position without manual interaction by the operator and instead under electrically operable controls.

Figure 1:
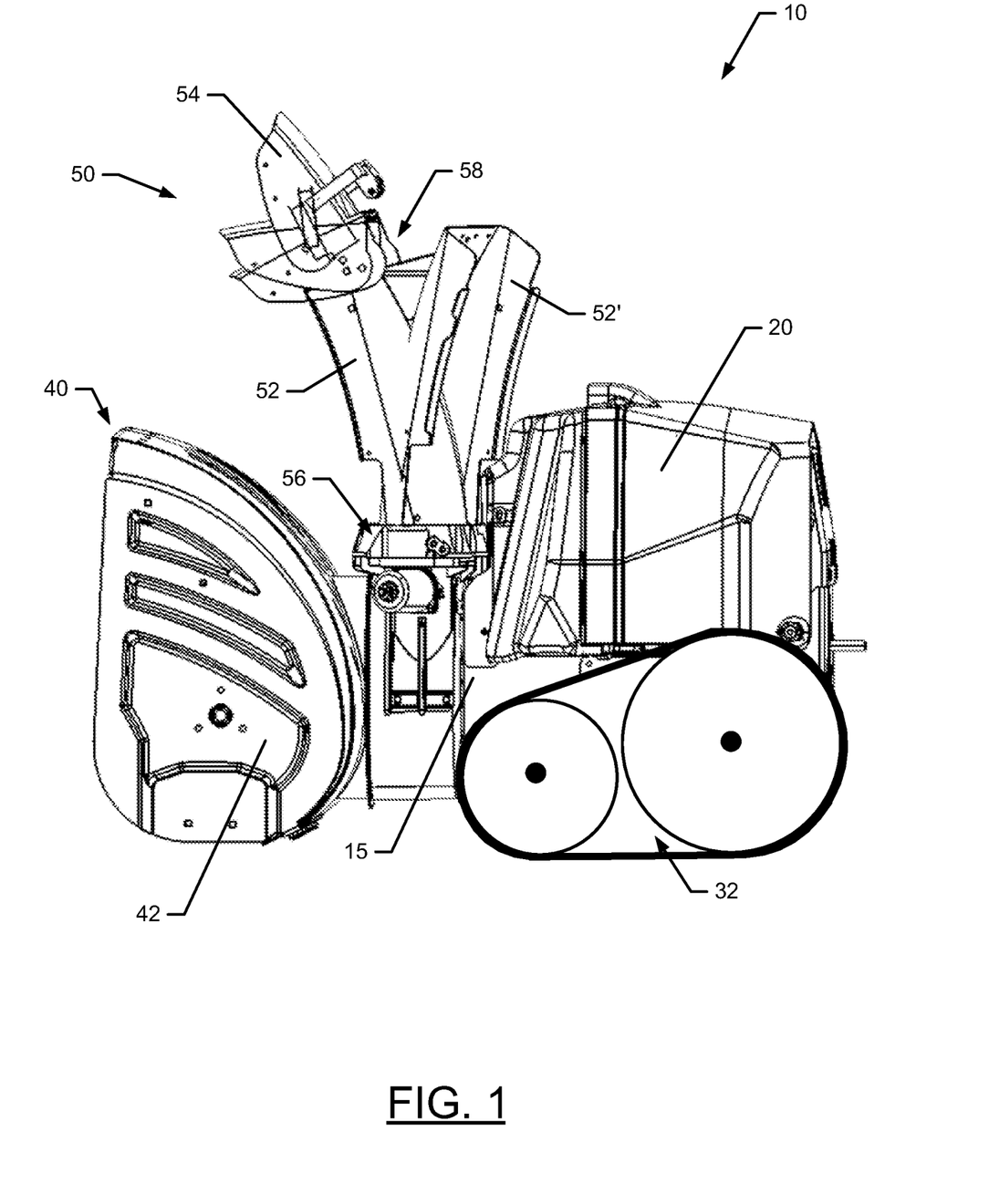
FIG. 1 illustrates an side view of a snow removal device in accordance with an example embodiment.
Figure 2:
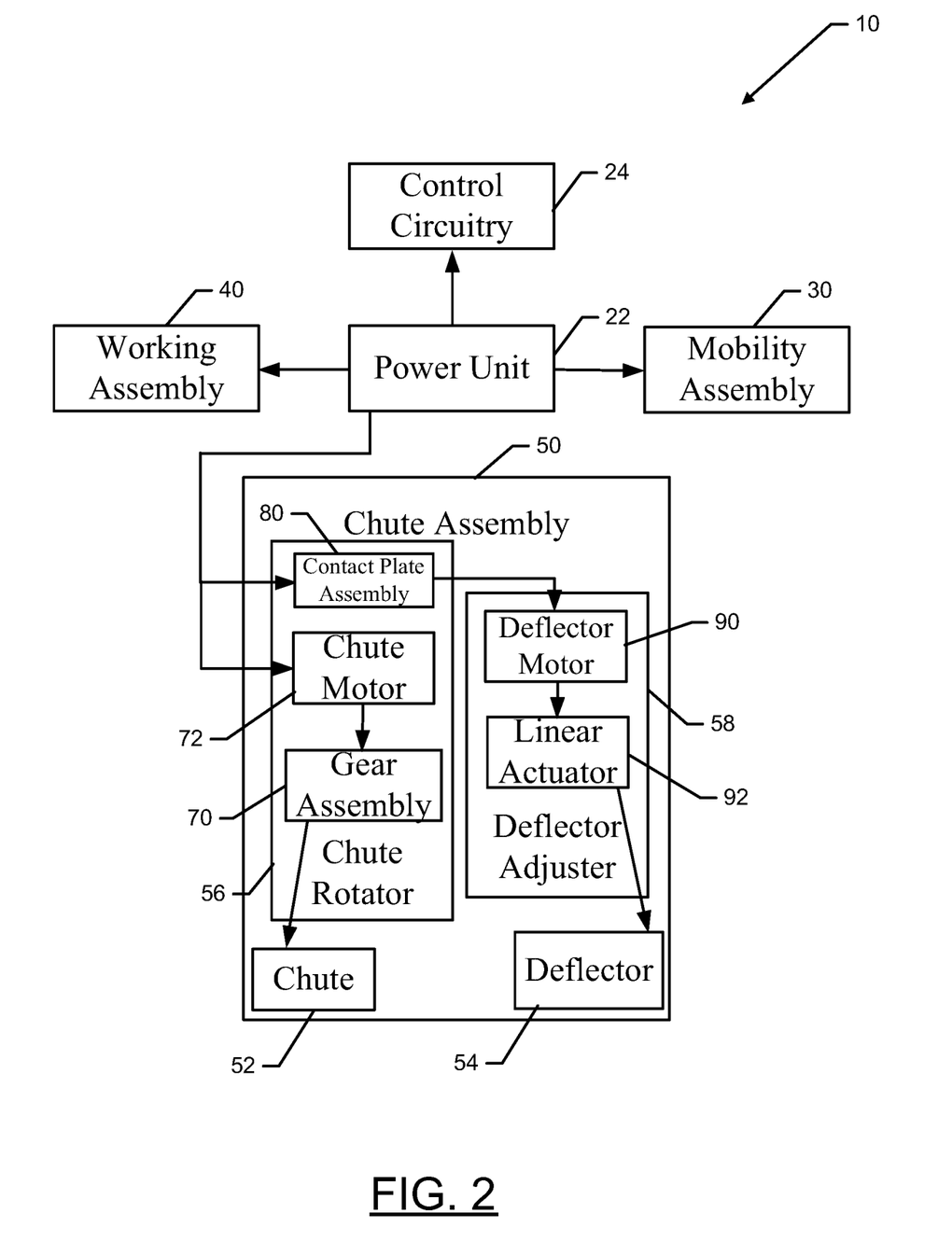
FIG. 2 illustrates a block diagram of various components of the snow removal device of an example embodiment.

FIG. 1 illustrates an example of a remotely operable or autonomously operable robotic vehicle in the form of a snow removal device 10, and FIG. 2 illustrates a block diagram of the snow removal device 10. Although the snow removal device 10 (e.g., a snow blower or snow thrower) of FIGS. 1 and 2 is shown as a robotic vehicle, it should be appreciated that example embodiments could be employed in connection with other devices that are not robotic as well. Thus, for example, walk behind power equipment may use example embodiments as well. In such cases, it may be the case that the operator station is movable, or the device may convert between manual and remote/autonomous operation. But in any case, it should be appreciated that example embodiments can be implemented on any snow removal device and not just on robotic vehicles.

In some embodiments, the snow removal device 10 may include a chassis 15 or frame to which various components of the snow removal device 10 may be attached. For example, the chassis 15 may support a power unit housing 20 inside which a power unit 22 such as an engine (e.g., a gasoline powered engine) or an electric motor and corresponding battery may be housed. The power unit 22 may be operably coupled to a mobility assembly 30 (which is a track assembly 32 in this example) and a working assembly 40 to power either or both of the mobility assembly 30 and the working assembly 40.

The snow removal device 10 may include a track assembly 32 (or continuous tracks), wheels or any other suitable means for moving the snow removal device 10 as the mobility assembly 30. The mobility assembly 30 may support a substantial portion of the weight of the snow removal device 10 when the snow removal device 10 is stationary. The mobility assembly 30 may also provide for mobility of the snow removal device 10. In some cases, the mobility assembly 30 may be driven via power from the power unit 22 based on remote or autonomous control inputs.

In an example embodiment, the working assembly 40 may be a single or dual stage snow thrower. As such, for example, if dual stage, the working assembly 40 may include a rotatable auger (or auger blade) that is configured to work (e.g., spin, rotate, turn, and/or the like) in order to direct snow toward an impeller (or impeller blade) that also works (e.g., spins, rotates, turns, and/or the like) to direct snow toward a discharge path to be ejected from the snow removal device 10. Single stage versions may only include only the auger. However, it should be appreciated that the working assembly 40 of some embodiments could include a power brush or other implement used to move snow toward a second stage device (e.g., the impeller) for ejection from the working assembly 40. In an example embodiment, the working assembly 40 may be powered via operable coupling to the power unit 22. The operable coupling of the working assembly 40 to the power unit 22 may be selectively engaged and/or disengaged (e.g., via a clutch, one or more selectively engageable chains/belts/pulleys, a friction wheel or other similar devices). Components of the working assembly 40 (e.g., the auger and the impeller) may be housed in a bucket assembly 42.

As can be appreciated from FIG. 1, the bucket assembly 32 prevents escape of snow and directs the snow into the ejection path. Thus, the bucket assembly 32 also protects the operator from blowback and allows for a somewhat orderly disposal of the snow that is ejected by the snow removal device 10. The ejection path of the snow removal device 10 may be formed at least in part by the bucket assembly 32 and a discharge chute or chute assembly 50. As such, for example, the ejection path may begin proximate to an input of the impeller, at which point snow is imparted with momentum at an output of the impeller to be pushed toward, and ultimately through, the chute assembly 50.

In an example embodiment, the chassis 15 may also support the chute assembly 50. The chute assembly 50 may include a chute 52 and a deflector 54. The chute 52 may define an ejection path for snow propelled by or from the working assembly 40. The chute 52 may, in some cases, be an elongated sheet (or sheets) of metal or other rigid material that may be formed to partially or fully enclose the lateral sides of the ejection path. In the example shown, the chute 52 encloses only three sides of the ejection path in order to minimize the material required to form the chute 52. However, all four sides may be enclosed in some alternatives.

The deflector 54 may be disposed at a distal end of the chute 52 to provide an adjustable deflection surface for direction snow ejected from the distal end of the chute 52 at a desired angle relative to the direction of travel of the snow in the chute 52. Accordingly, for example, the deflector 54 may be a sheet (or sheets) of metal or other rigid material that can be rotated relative to the distal end of the chute 52 in order to change the deflection angle for ejected snow.

As noted above, it is not uncommon for either or both of the chute 52 and the deflector 54 to be adjustable. The chute 52 may therefore be adjustable to another chute orientation 52', and the deflector 54 may also be adjustable to other deflector orientations 54' and 54". While these adjustments of orientation are known in general terms, they are typically conducted in a context in which there are physical limits to the adjustability of the chute 52 (e.g., over a range of angles). The physical limits tend to facilitate (or allow) use of cables and wires for pulling and turning components for adjustment of the chute 52 and/or deflector 54.

However, example embodiments may allow the adjustment of the chute 52 to the other chute orientation 52' to pass through a continuous range of 360 degrees. Thus, the chute 52 could be directly adjusted from the position shown in FIG. 1 to the other chute orientation 52' in either direction. Moreover, any number of full circles of 360 degrees could be conducted prior to reaching the other chute orientation 52'. This continuous adjustment capability for the chute 52 not only renders the use of cables and wires impossible for the adjustment of the chute 52, but remote adjustment of the deflector 54 is also disrupted by this significant modification.

In order to provide for the remote adjustment of the chute 52 and the deflector 54, the chute assembly 50 of example embodiments may also include a chute rotator 56 and a deflector adjuster 58 as described in greater detail below. In this regard, the chute rotator 56 may be configured to enable continuous adjustment of the chute 52 over greater than 360 degrees, and the deflector adjuster 58 may allow remote adjustment of the deflector 54 in the context of a fully rotatable (i.e., greater than 360 degrees) chute 52.

FIG. 2 illustrates various structures of the chute rotator 56 and the deflector adjuster 58 of an example embodiment. In this regard, the chute rotator 56 may include a gear assembly 70 and a chute motor 72 (e.g., an electric motor such as a brushless DC (BLDC) motor). The gear assembly 70 may include a drive gear that receives power from the chute motor 72 and a driven gear that is affixed to the chute 52 so that when the driven gear turns, the chute 52 turns with the driven gear. The chute motor 72 may receive power from the power unit 22 (e.g., responsive to receipt of a rotation instruction from a local controller or remote controller of the snow removal device 10) and may turn the drive gear according to the rotation instruction received (e.g., in the direction and perhaps also at the speed instructed). The drive gear may correspondingly engage the driven gear and turn the driven gear accordingly. The chute 52 may then be carried with the driven gear to rotate in accordance with the rotation instruction. Some embodiments may further include one or more instances of an idler gear between the drive gear and the driven gear.

As noted above, it may not normally be possible to use wires or cables to operate the deflector 54 under remote control when the chute 52 can rotate 360 degrees since the wires or cables will define movement limits or become tangled or damaged by the movements. In an example embodiment, the chute rotator 56 may solve this problem by providing a contact plate assembly 80 that is configured to provide power to the deflector adjuster 58 even when the chute rotator 56 enables full continuous 360 degree rotation of the chute 52. The contact plate assembly 80 may include substantially circular electrically conductive plates that have a central opening that corresponds to the ejection path defined through the chute 52. Thus, the plates of the contact plate assembly 80 may rotate with the chute 52 and the driven gear, and provide consistent power connections to a deflector motor 90 (e.g., another electric motor such as a Brushed DC motor) of the deflector adjuster 58. The deflector adjuster 58 may therefore receive an adjustment instruction, which may provide power to the deflector motor 90 via the contact plate assembly 80. The deflector motor 90 may in turn operate to drive a linear actuator 92, which may extend between the deflector 54 and the chute 52. The driving of the linear actuator 92 may change the orientation angle of the deflector 54 relative to the distal end of the chute 52. As an alternative, the deflector motor 90 may pull a cable or wire that is attached to the deflector 54 (e.g., via a pulley) to change the orientation of the deflector 54. Thus, for example, the linear actuator 92 may be a threaded lead screw, a device capable of pulling the cable linearly in one direction or the other to actuate the deflector, or any other device that creates motion in a straight line.

In an example embodiment, controls for operation of the working assembly 40, the mobility assembly 30, the power unit 22, and/or the chute assembly 50 may be handled by control circuitry 24 of the snow removal device 10. Thus, for example, the rotation instruction for rotating the chute 52 and/or the adjustment instruction or pivoting the deflector 54 may be provided by control circuitry 24. In an example embodiment, the control circuitry 24 may be configurable for autonomous operation of the snow removal device 10, or the control circuitry 24 may include or otherwise be in communication with wireless communication equipment that enable remote operation of the snow removal device 10.

Accordingly, using the hardware described above, no wires or cables may need to pass through the chute rotator 56, which could otherwise be damaged or inhibit free movement of the chute 52. Instead, the contact plate assembly 80 (and therefore the chute rotator 56) provide power for remote operation of the deflector 54 even though the chute 52 is allowed to continuously rotate over 360 degrees.

Figure 3:
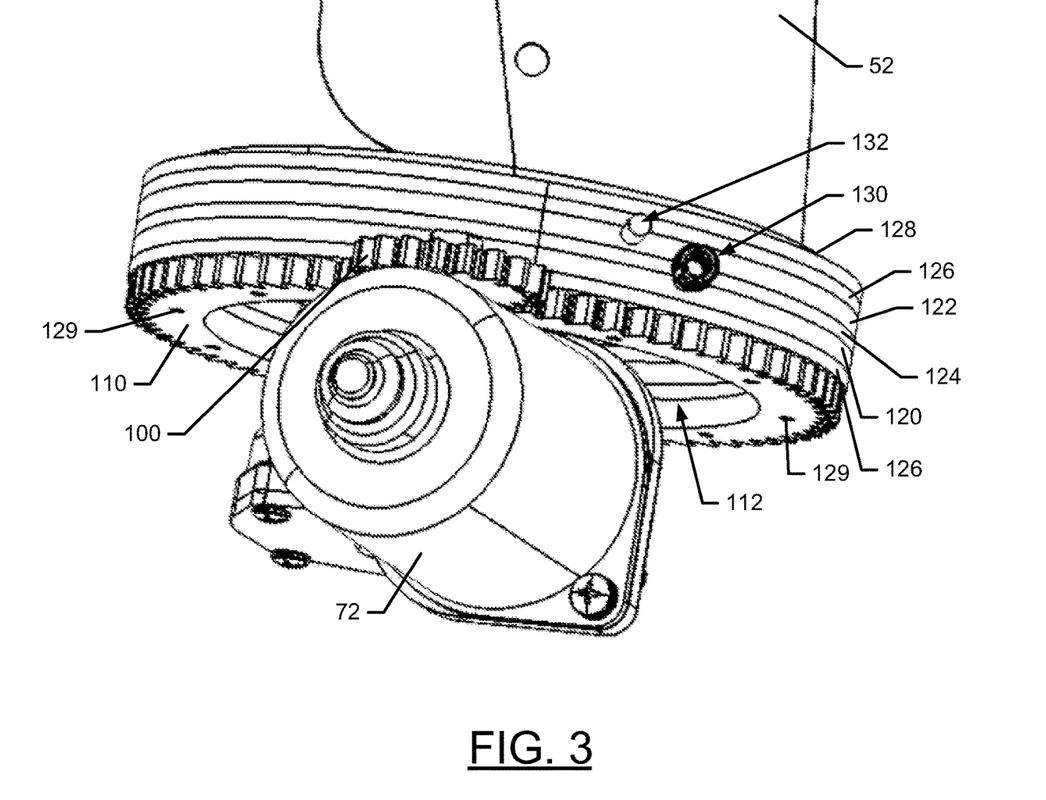
FIG. 3 illustrates a perspective view of a chute rotator in accordance with an example embodiment.
Figure 4:
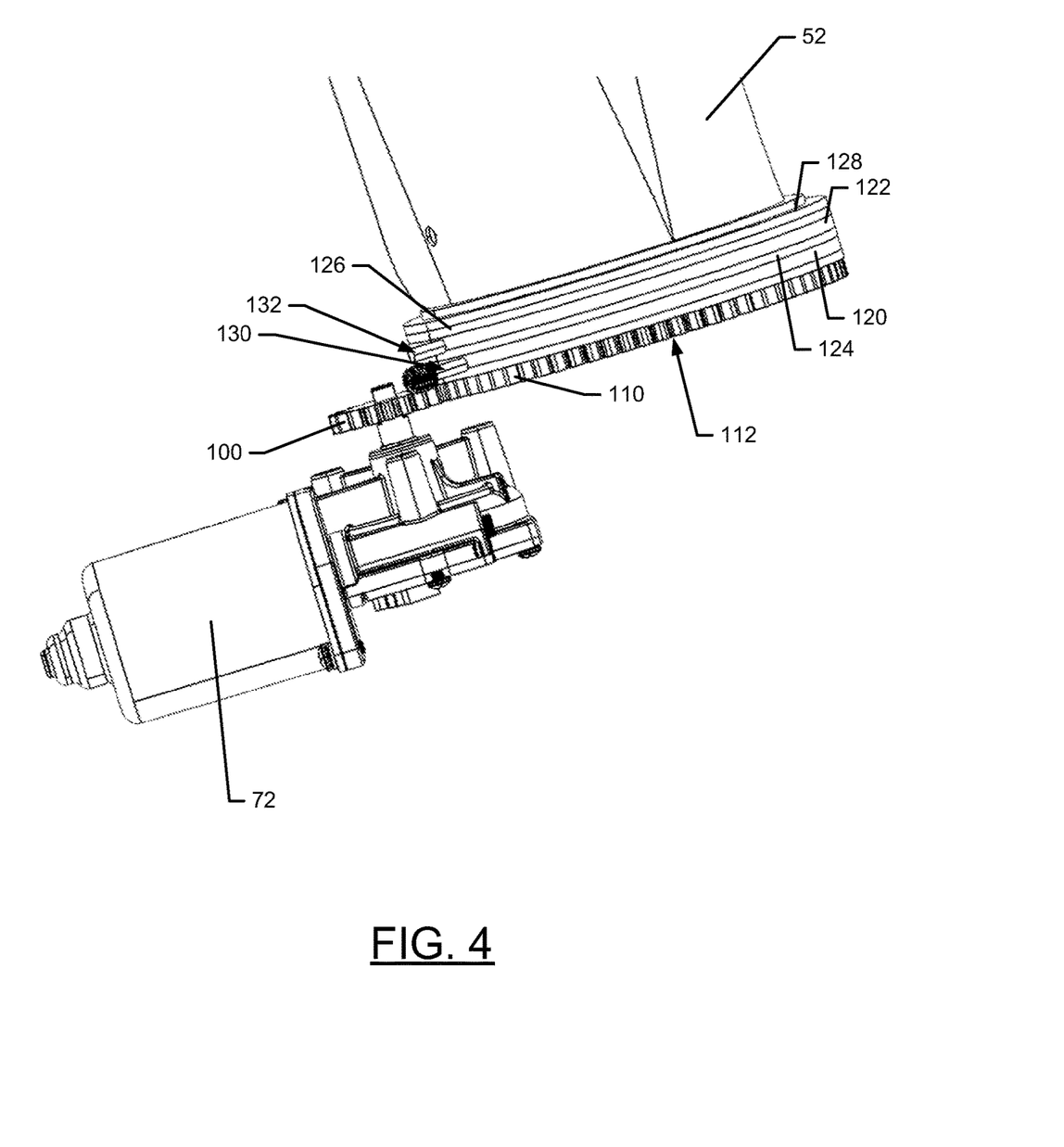
FIG. 4 illustrates another perspective view of the chute rotator in accordance with an example embodiment.

FIGS. 3 and 4 each illustrate a partially isolated perspective view of the components of the chute rotator 56 of an example embodiment. In this regard, FIGS. 3 and 4 show the chute motor 72, which is operably coupled to drive gear 100. Drive gear 100 is in turn operably coupled to driven gear 110. The driven gear 110 is concentrically formed along with a first plate 120 and a second plate 122 of the contact plate assembly 80. The driven gear 110 is, like the first and second plates 120 and 122, hollow in its center to define part of ejection path 112, which extends into the chute 52.

The first plate 120 and the second plate 122 may, for example, be positive and negative plates, respectively (or vice versa) that are separated by an insulator 124. Other insulators 126 may also be provided on opposing axial sides of the first and second plates 120 and 122 to further isolate the first and second plates 120 and 122 electrically. In some cases, a third metallic plate 128 may be provided for additional structural robustness, and the chute 52 may be operably coupled to the third metallic plate 128. Pins 129 may pass through the driven gear 110, the first and second plates 120 and 122, the insulators 124 and 126 and the third metallic plate 128 to keep all such components affixed relative to each other such that the rotation of the driven gear 110 (responsive to operation of the chute motor 72) causes corresponding rotation of the chute 52.

Figure 5:
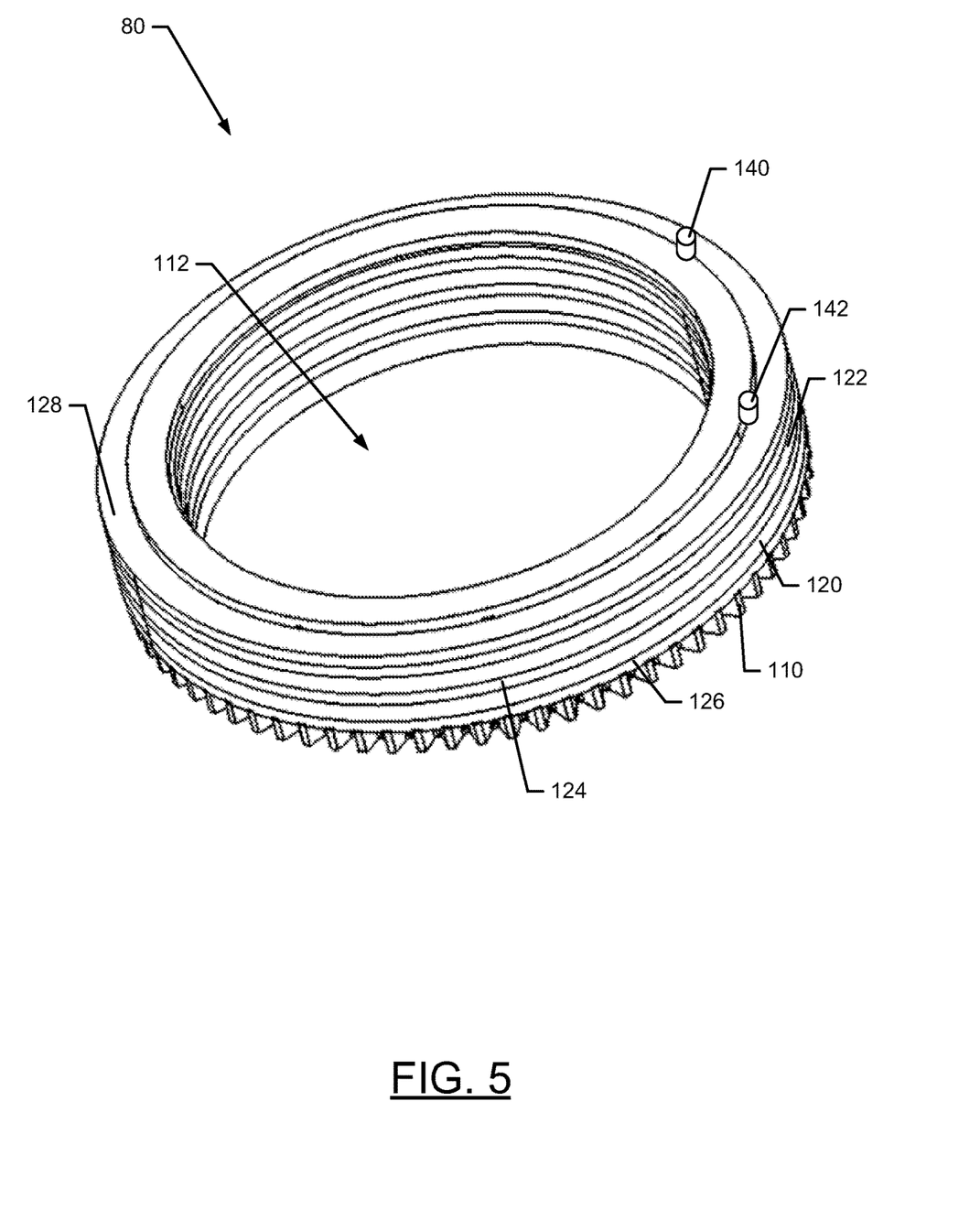
FIG. 5 illustrates a perspective view of a contact plate assembly of the chute rotator in isolation according to an example embodiment.

The first plate 120 may be operably coupled to a first brush 130 and the second plate 122 may be operably coupled to a second brush 132. The first and second brushes 130 and 132 may form a brush assembly that provides electrical power from the power unit 22 through the contact plate assembly 80 to the deflector motor 90. In an example embodiment, a first conductive roll pin 140 may extend from the first plate 120 through the third metallic plate 128 and the insulators 124 and 126 that are disposed between the first plate 120 and the chute 52. An electrical wire, cable, or other conductor may extend from the first conductive roll pin 140 to the deflector motor 90. Similarly, a second conductive roll pin 142 may extend from the second plate 122 through the third metallic plate 128 and the insulator 126 that is disposed between the second plate 122 and the chute 52. An electrical wire, cable, or other conductor may extend from the second conductive roll pin 142 to the deflector motor 90. The first and second conductive roll pins 140 and 142, which are shown in FIG. 5, may represent positive and negative terminals for powering the deflector motor 90.

Figure 6:
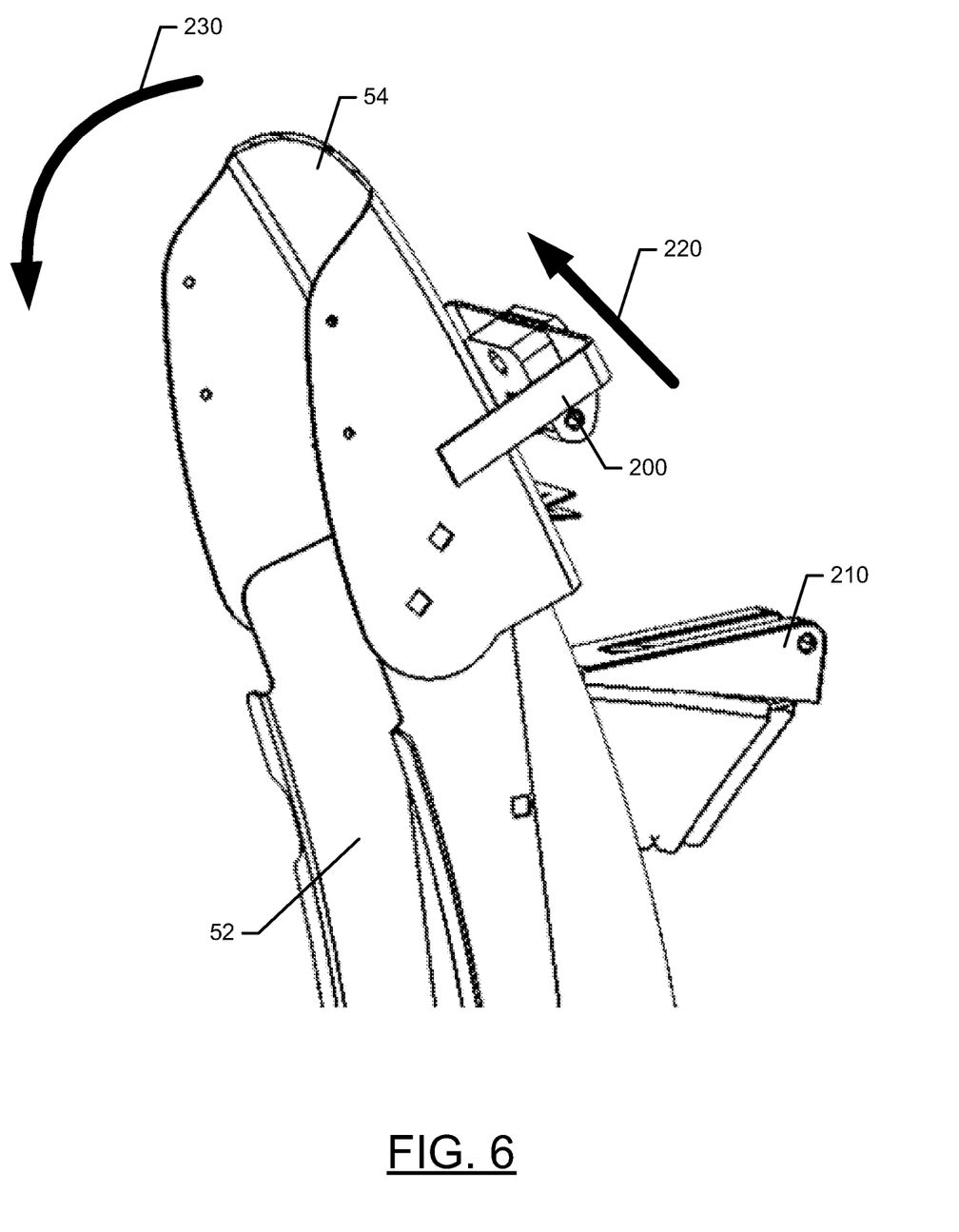
FIG. 6 illustrates a perspective view of a deflector according to an example embodiment.

FIG. 6 shows a distal end of the chute 52 with the deflector 54 positioned substantially aligned with walls of the chute 52 to avoid deflecting snow in the ejection path. The deflector 54 includes a deflector bracket 200 and a support bracket 210 is disposed proximate to the distal end of the chute 52. In an example embodiment, the support bracket 210 may support the deflector motor 90 of FIG. 2, and the linear actuator 92 may operate to move the deflector bracket 200 along a line shown by arrow 220 in order to tilt the deflector 54 as shown by arrow 230.

In an example embodiment, a robotic vehicle such as a snow removal device may be provided. The snow removal device may include a chassis supporting a power unit, a mobility assembly operably coupled to the chassis to provide mobility for the snow removal device responsive to power provision from the power unit, a working assembly configured to move snow to an ejection path responsive to power provision from the power unit, and a chute assembly forming a portion of the ejection path, the chute assembly comprising a chute and a deflector. The chute may be rotatable via a chute rotator configured to provide at least 360 degree automated rotation of the chute. An orientation of the deflector may be changeable via automated pivoting of the deflector via an electrically operable deflector adjuster.

The snow removal device of some embodiments may include additional features, modifications, augmentations and/or the like to achieve further objectives or enhance performance of the device. The additional features, modifications, augmentations and/or the like may be added in any combination with each other. Below is a list of various additional features, modifications, and augmentations that can each be added individually or in any combination with each other. For example, the chute rotator may include a contact plate assembly configured to rotate with the chute and interface with a brush assembly to provide power from the power unit to the deflector adjuster. In an example embodiment, the deflector adjuster may include a deflector motor and a linear actuator. In some examples, the linear actuator may be operably coupled to a deflector bracket on the deflector, and responsive to operation of the deflector motor, the linear actuator may move the deflector bracket to pivot the deflector relative to a distal end of the chute. In an example embodiment, the deflector motor may be disposed at a support bracket proximate to a distal end of the chute. In some cases, the contact plate assembly may include a first conductive plate and a second conductive plate separated from each other by an insulator. The first and second conductive plates may be operably coupled to the chute to rotate with the chute. The first conductive plate may be operably coupled to a first conductive roll pin, and the second conductive plate may be operably coupled to a second conductive roll pin. The first and second conductive pins may provide positive and negative power terminals for operation of the deflector motor. In an example embodiment, the chute rotator may include drive gear and a driven gear. The drive gear may be operably coupled to a chute motor, and the driven gear may be operably coupled to the chute. The chute may be rotated responsive to operation of the chute motor to turn the driven gear via rotation of the drive gear. In some cases, the driven gear, the first conductive plate and the second conductive plate may each be concentric with respect to each other and surround a portion of the ejection path. In an example embodiment, one or more holding members (e.g., pins, screws, rivets, etc.) may hold the first and second conductive plates, the driven gear and the insulator in fixed positions relative to each other. In some cases, the working assembly may be a single stage or dual stage snow thrower. In an example embodiment, the deflector adjuster may include a deflector motor, and the chute rotator may include a chute motor. The chute motor and the deflector motor may each be brushed DC motors.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A snow removal device comprising:
   a chassis supporting a power unit;
   a mobility assembly operably coupled to the chassis to provide mobility for the snow removal device responsive to power provision from the power unit;
   a working assembly configured to move snow to an ejection path responsive to power provision from the power unit; and
   a chute assembly forming a portion of the ejection path, the chute assembly comprising a chute and a deflector,
   wherein the chute is rotatable via a chute rotator configured to provide at least 360 degree automated rotation of the chute,
   wherein an orientation of the deflector is changeable via automated pivoting of the deflector via an electrically operable deflector adjuster and
   wherein the chute rotator comprises a contact plate assembly configured to rotate with the chute and interface with a brush assembly to provide power from the power unit to the deflector adjuster.

2. The snow removal device of claim 1, wherein the deflector adjuster comprises a deflector motor and a linear actuator.

3. The snow removal device of claim 2, wherein the linear actuator is operably coupled to a deflector bracket on the deflector, and
   wherein responsive to operation of the deflector motor, the linear actuator moves the deflector bracket to pivot the deflector relative to a distal end of the chute.

4. The snow removal device of claim 3, wherein the deflector motor is disposed at a support bracket proximate to a distal end of the chute.

5. The snow removal device of claim 2, wherein the contact plate assembly comprises a first conductive plate and a second conductive plate separated from each other by an insulator, the first and second conductive plates being operably coupled to the chute to rotate with the chute,
   wherein the first conductive plate is operably coupled to a first conductive pin, and the second conductive plate is operably coupled to a second conductive pin, and
   wherein the first and second conductive pins provide positive and negative power terminals for operation of the deflector motor.

6. The snow removal device of claim 5, wherein the chute rotator comprises drive gear and a driven gear, the drive gear being operably coupled to a chute motor, and the driven gear being operably coupled to the chute,
   wherein the chute is rotated responsive to operation of the chute motor to turn the driven gear via rotation of the drive gear.

7. The snow removal device of claim 6, wherein the driven gear, the first conductive plate and the second conductive plate are each concentric with respect to each other and surround a portion of the ejection path.

8. The snow removal device of claim 7, wherein one or more holding members hold the first and second conductive plates, the driven gear and the insulator in fixed positions relative to each other.

9. The snow removal device of claim 1, wherein the working assembly is a single stage or dual stage snow thrower.

10. The snow removal device of claim 1, wherein the deflector adjuster comprises a deflector motor, and the chute rotator comprises a chute motor, and
    wherein chute motor and the deflector motor are each brushed DC motors.

11. A chute assembly for a snow removal device, the chute assembly comprising:
- a chute forming a portion of an ejection path from a working assembly of the snow removal device; and
- a deflector disposed at a distal end of the chute,
- wherein the chute is rotatable via a chute rotator configured to provide at least 360 degree automated rotation of the chute responsive to power provision from a power unit,
- wherein an orientation of the deflector is changeable via automated pivoting of the deflector via an electrically operable deflector adjuster and,
- wherein the chute rotator comprises a contact plate assembly configured to rotate with the chute and interface with a brush assembly to provide power from the power unit to the deflector adjuster.

12. The chute assembly of claim 11, wherein the deflector adjuster comprises a deflector motor and a linear actuator.

13. The chute assembly of claim 12, wherein the linear actuator is operably coupled to a deflector bracket on the deflector, and
- wherein responsive to operation of the deflector motor, the linear actuator moves the deflector bracket to pivot the deflector relative to a distal end of the chute.

14. The chute assembly of claim 13, wherein the deflector motor is disposed at a support bracket proximate to a distal end of the chute.

15. The chute assembly of claim 12, wherein the contact plate assembly comprises a first conductive plate and a second conductive plate separated from each other by an insulator, the first and second conductive plates being operably coupled to the chute to rotate with the chute,
- wherein the first conductive plate is operably coupled to a first conductive pin, and the second conductive plate is operably coupled to a second conductive pin, and
- wherein the first and second conductive pins provide positive and negative power terminals for operation of the deflector motor.

16. The chute assembly of claim 15, wherein the chute rotator comprises drive gear and a driven gear, the drive gear being operably coupled to a chute motor, and the driven gear being operably coupled to the chute,
- wherein the chute is rotated responsive to operation of the chute motor to turn the driven gear via rotation of the drive gear.

17. The chute assembly of claim 16, wherein the driven gear, the first conductive plate and the second conductive plate are each concentric with respect to each other and surround a portion of the ejection path.

18. The chute assembly of claim 17, wherein one or more holding members hold the first and second conductive plates, the driven gear and the insulator in fixed positions relative to each other.

* * * * *